(12) United States Patent
Bhogal et al.

(10) Patent No.: US 8,553,860 B1
(45) Date of Patent: Oct. 8, 2013

(54) AUTO-SAVE, RETRIEVAL, AND PRESENTATION OF KEY PRESS SEQUENCES

(75) Inventors: Kulvir Singh Bhogal, Fort Worth, TX (US); Lisa Seacat DeLuca, San Francisco, CA (US); Lydia M. Do, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/530,354

(22) Filed: Jun. 22, 2012

(51) Int. Cl.
*H04M 11/00* (2006.01)

(52) U.S. Cl.
USPC ..................................... 379/93.17; 379/93.27

(58) Field of Classification Search
USPC ................. 379/88.19, 93.17, 93.27, 355.01
See application file for complete search history.

(56) References Cited

U.S. PATENT DOCUMENTS

| | | | |
|---|---|---|---|
| 5,526,424 | A | 6/1996 | Karnowski |
| 5,963,636 | A | 10/1999 | Boakes |
| 6,804,338 | B1 | 10/2004 | Chen |
| 2004/0052355 | A1* | 3/2004 | Awada et al. ............ 379/355.01 |
| 2009/0016503 | A1* | 1/2009 | Lee et al. ................... 379/93.27 |
| 2012/0219128 | A1* | 8/2012 | Farah et al. ................ 379/88.19 |

FOREIGN PATENT DOCUMENTS

| | | |
|---|---|---|
| CN | 1610370 A | 4/2005 |
| KR | 2003064514 | 8/2003 |

OTHER PUBLICATIONS

Mu-Chun Su et al., "A Simple and inexpensive Telephone dialling Aid for the Disabled", Feb. 2004.

* cited by examiner

*Primary Examiner* — Mohammad Islam
*Assistant Examiner* — Van D Huynh
(74) *Attorney, Agent, or Firm* — Cahn & Samuels, LLP; Louis J. Percello, Esq.

(57) ABSTRACT

An embodiment of the invention provides a method for communicating on a telecommunications device, wherein a telephone number is received from a user via an interface of the telecommunications device. At least one character from the user is also received via the interface in response to key press options presented to the user. The telephone number and the character received from the user are automatically saved on a memory device. The character is automatically associated with the telephone number. Contextual information associated with the character is saved, wherein the contextual information indicates the time of day that the character is entered, the date that the character is entered, and/or the type of call where the character is entered. The character is presented to the user in a list of previously entered characters on a display of the telecommunications device during a subsequent telephone call to the saved telephone number.

17 Claims, 7 Drawing Sheets

AUTO-SAVE, RETRIEVAL, AND PRESENTATION OF KEY PRESS SEQUENCES

BACKGROUND

The present invention is in the field of methods, systems, devices, and computer program products for auto-saving, retrieval, and presentation of key press sequences.

Many conventional telephones incorporate an abbreviated dialing feature where a telephone number that has been previously dialed on a caller's device is automatically dialed with just a few keystrokes. Telephones, in this context, include cellular and mobile telephones, facsimile machines or any device a user may use to dial a telephone number. Abbreviated dialing utilizes recent cache or stored memory on the telephone in addition to any cross-references to the caller's contact list.

SUMMARY OF THE INVENTION

An embodiment of the invention provides a method for communicating on a telecommunications device, wherein a telephone number is received from a user via an interface of the telecommunications device. At least one character from the user is also received via the interface of the telecommunications device in response to key press options presented to the user. The telephone number and the character received from the user are automatically saved on a memory device. The character is automatically associated with the telephone number. Contextual information associated with the character is saved, wherein the contextual information indicates the time of day that the character is entered, the date that the character is entered, and/or the type of call where the character is entered. The character is presented to the user in a list of previously entered characters on a display of the telecommunications device during a subsequent telephone call to the saved telephone number.

In another embodiment of the invention, a first telephone call is executed, which includes receiving a telephone number from a user and receiving at least one first character from the user, wherein the first character is received in response to key press options presented to the user. The telephone number and the first character received from the user are automatically saved on a memory device, wherein the first character is automatically associated with the telephone number. A subsequent telephone call is executed, which includes receiving the telephone number from the user, and receiving at least one second character from the user, wherein the second character is different from the first character. The second character received from the user is automatically saved on the memory device, wherein the at least one second character is automatically associated with the telephone number. A telephone call after the subsequent telephone call is executed, which includes receiving the telephone number from the user. The first character and the second character are presented to the user with a display of the telecommunications device.

In yet another embodiment of the invention, a method for communicating on a telecommunications device receives a telephone number from a user via an interface of a telecommunications device. A sequence of characters is received from the user via the interface of the telecommunications device, wherein the sequence of characters is received in response to key press options presented to the user. The telephone number and the sequence of characters received from the user are automatically saved on a memory device. Characters are auto-filled on a display of the telecommunications device with characters from the sequence of characters as the user enters a response to the key press options in a subsequent telephone call.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

The embodiments of the invention include methods, systems, devices, and computer program products to auto-save key press options associated with a dialed number, retrieve the key press options upon future dialing of the previously dialed number, and present the key press options to the caller. Thus, the caller is aided in remembering previous options pressed for a dialed number. The overall call-time which would otherwise be wasted in remembering associated options is thereby reduced. In the case where the caller cannot recall the associated options once a call is connected, the caller may disconnect the telephone call or give-up. This also allows ease of use for travelling callers who may not be able to fully interact with the telephone, e-mail or text messages, files, folders, documents, and the dial key press options.

Figure 1:
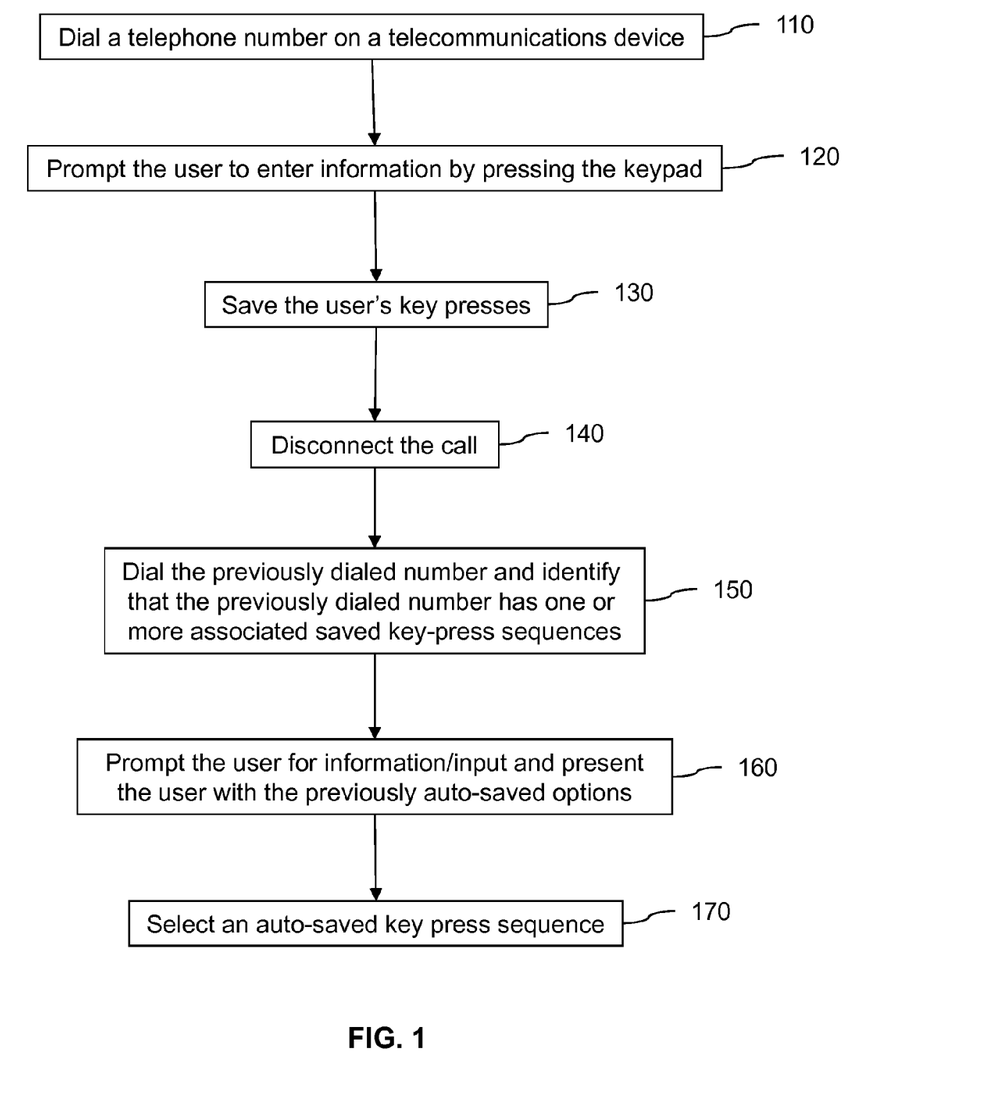
FIG. 1 is a flow diagram illustrating a method for auto-saving, retrieval, and presentation of key press sequences according to an embodiment of the invention.

FIG. 1 illustrates a method for auto-saving, retrieval, and presentation of key press sequences according to an embodiment of the invention. A user (also referred to herein as a "caller") dials a telephone number 110 on a telecommunications device, e.g., 800-555-0199. The user is connected to the dialed number and is prompted to enter information by pressing their keypad 120. For example, the user can be prompted to enter his or her voicemail password; member, social security, or other identification number; a participant passcode for a conference call; a directory extension number; and/or a selection from an automated menu (e.g., language preference). For instance, the user may be prompted to dial 1 for Dr. Smith, 2 for Dr. Johnson, 3 for Dr. Brown, or 4 for Dr. Doe. In another example, the user may be prompted to spell the first four letters of the person they are trying to reach using their keypad. In yet another example, the user may be prompted to press 1 for electronics, 2 for the toys, 3 for housewares, 4 for automotive, 5 for women's apparel, and 6 for men's apparel.

The user's key presses that were prompted by the dialed number are saved 130. As used herein, the terms "key presses", "key press sequences", "sequences", and "characters" are used interchangeably and refer to one or more numbers, letters, and/or punctuation symbols pressed by the user on a keypad on the telecommunications device. As used herein, the term "telecommunications device" refers to the apparatus used by the user to place the telephone call, e.g., mobile telephone, landline telephone, laptop, tablet, or desktop computer.

In at least one embodiment, the user's key presses are stored on a hardware memory device on the telecommunications device used by the user to select the key presses. The dialed telephone number is also stored and associated/linked with the key presses. Multiple combinations of key presses for the dialed telephone number may be saved. The user may dial the telephone number for different reasons, and may press more than one unique key press sequences. Thus, for example, four different sequences of key presses can be saved and associated with the telephone number "800-555-0199". If the user mis-presses a key, then the user may have the option to un-do the mis-pressed number during the call (i.e., re-key the prompted selection), delete any mis-pressed or stray key presses at the end of the call, or restart the auto-save. In at least one embodiment, the user may anticipate never calling the dialed number again; and therefore, the user has the option to select whether the key presses are saved. In at least one embodiment of the invention, any pauses during the user's key dialing are also recorded. For example, a pause of four seconds would translate into a pause indicator of "pppp" (or ",,,,", depending on the device). Thus, if the user dials "4", "7", pauses 4 seconds and then dials "2", then the key presses "47 pppp2" are saved. In at least one embodiment, meta-data information (also referred to herein as "contextual information") is tagged or attached to an auto-saved key press sequence during the call or after the call has been completed. Such information can be manually entered by the user (using the keypad or microphone of the telecommunications device), or the telecommunications device can save the information automatically. For example, information such as the time of day, day of week, and/or type of call (business, networking, teleconference, appointments, voicemail, family, friends, shopping, medical) can be saved on the memory device and associated with the dialed telephone number.

In at least one embodiment, the type of call is manually entered by the user via the interface (e.g., appointments, networking). In another embodiment, the type of call is determined by the processor, where specific telephone numbers are associated with specific call types. For example, a first telephone number for Dr. Smith is associated with the type "medical"; second, third, and fourth telephone numbers for three different retailers are associated with the type "shopping"; fifth, sixth, seventh, and eighth telephone numbers for four of the user's family members are associated with the type "family"; and, ninth and tenth telephone numbers for the user's boss and coworker are associated with the type "work".

The user hangs up to disconnect the call 140. At some later time, the user dials the previously dialed number (in item 110); and, the telecommunications device identifies that the previously dialed number has one or more associated saved key-press sequences 150. In at least one embodiment, the telecommunications device is synced to other telecommunications device(s) of the user such that a different device (i.e., a device different from the device used in item 110) can identify that the previously dialed number has one or more associated saved key-press sequences. In another embodiment, the telecommunications device uploads saved client device data to the cloud or dedicated servers, such that a different device (i.e., a device different from the device used in item 110) can identify that the previously dialed number has one or more associated saved key-press sequences.

After the call is connected and the user is prompted for information/input, the user is presented with the previously auto-saved options 160. More specifically, one or more of the auto-saved key press sequences associated with the dialed telephone number are presented to the user, either on a display of the telecommunications device and/or audibly through the telecommunications device's earphone, headset, or speaker. In at least one embodiment of the invention, a processor on the telecommunications device identifies that the telephone number dialed in item 140 is saved on the memory device, and retrieves the key-press sequences associated with the dialed telephone number from the memory device for presentation to the user.

In at least one embodiment, the processor identifies the most recently saved and/or selected auto-saved key presses to present to the user first. In another embodiment, the processor identifies the auto-saved key press sequences that are most frequently selected to be presented to the user first. In yet another embodiment, as described more fully below, contextual information (e.g., time of day, type of call, tagged information, etc.) can be used by the processor to choose which auto-saved key presses to present to the user.

The user selects an auto-saved key press sequence via the keypad or verbally via the microphone of the telecommunications device 170. For example, in one embodiment, the user sees that he has previously pressed "1#"; and, the user presses "1" followed by "#" on the keypad. This may be applicable when the previously saved sequence is a short or small in number. In another embodiment, the user may rely on aid by an application which can process the sequence and simulate the key press. For example, the telecommunications device presents the auto-saved key press sequences "15938745#" and "34097746#" to the user (e.g., visually on a display); the user selects "15938745#" using a rollerball, touchpad/screen, arrow keys, or voice command; and, the telecommunications device enters the sequence "15938745#".

In at least one embodiment of the invention, as the characters of the selected auto-saved key press sequence are entered, the characters of the auto-saved key presses may change in appearance as to provide feedback to the user on where in the progress of the auto-saved key press sequence has been executed. For example, for the sequence "2 4 0", the "2" digit can be boldfaced or highlighted to indicate that the telecommunications device is currently entering or has entered the "2" digit; and, the "4" and "0" digits have not been entered/executed yet.

The following provides an exemplary implementation of a method, system, device, and computer program product according to an embodiment of the invention. John hosts a daily status conference call at 9:00 AM. He typically dials 1-888-555-0199 between 8:55 AM and 9:00 AM to enter the conference call. When John is connected to the conference call, he is presented with his auto-saved key press sequence, which represents his host passcode. In a different telephone call at 2:00 PM, John dials the same conference call phone number, i.e., 1-888-555-0199. John enters a participant passcode, which is auto-saved as a new sequence. The next day, John is asked to call back into the 2:00 PM conference call. After dialing 1-888-555-0199, the previously entered participant passcode is presented first to John because the participant passcode was the sequence entered by John, and the time is not 8:55 AM-9:00 AM, which is typically the time of day when John uses his host passcode.

In another exemplary implementation, Sarah dials her mobile carrier's customer service telephone number. When she places this call, she presses Option "2", then Option "4", then Option "0". Sarah then hangs up to disconnect the call. The next few months, Sarah calls her mobile carrier's customer service telephone number again. After the call is connected, the key press sequence "240" is suggested to Sarah again as it is used most often. Sarah presses "2", "4", "0" without having to listen to the menu options, and is able to quickly have her call directed to her desired recipient.

Figure 2:
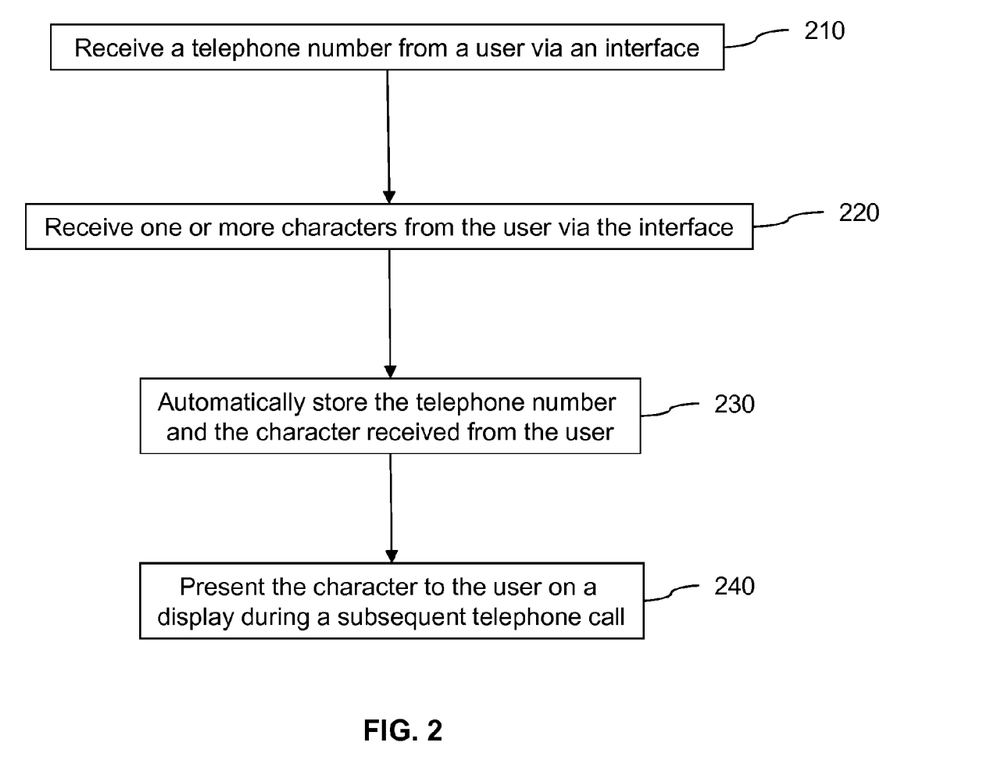
FIG. 2 is a flow diagram illustrating a method for communicating on a telecommunications device according to an embodiment of the invention.

FIG. 2 is a flow diagram illustrating a method for communicating on a telecommunications device according to an embodiment of the invention. A telephone number is received from a user via an interface (e.g., keypad, keyboard, touchscreen display) of a telecommunications device 210. The user can enter the entire telephone number via the interface or a partial telephone number that is auto-completed by the telecommunications device.

One or more characters (also referred to herein as a "key press", "key presses" or "key press sequence") is received from the user via the interface of the telecommunications device 220. The character (e.g., number, letter, or punctuation symbol) is received in response to key press options (e.g., conference call password, voicemail password, language selection, directory/menu options) presented to the user through the telecommunications device. As used herein, the term "present", "presented", and "presenting" include visually and/or audibly communicating with the user. For example, after entering a telephone number, the user is audibly prompted for a conference call password; and, the conference call password is entered by the user via the interface.

The telephone number and the character received from the user are automatically stored 230. In at least one embodiment, the telephone number and/or the character are stored on a memory device in or connected to the telecommunications device. In another embodiment, the user is presented with the option to save the telephone number and/or the character. In yet another embodiment, the character is automatically associated with the telephone number on the memory device.

During a subsequent telephone call (i.e., after the user disconnects from the present telephone call and re-dials the telephone number), the character is presented to the user on a display of the telecommunications device 240. More specifically, a processor in the telecommunications device receives the telephone number via the interface and identifies that the telephone number has been previously entered into the telecommunications device. The processor searches the memory device to identify any dialed characters that are associated with the telephone number, i.e., any characters that were entered into the telecommunications device during a previous telephone call where the telephone number was dialed. The identified characters are presented to the user visually on the display and/or audibly via the earphone, headset, or speaker of the telecommunications device.

During a subsequent telephone call (i.e., after the first instance where the telephone number is dialed on the telecommunications device) where the telephone number is dialed and the key press options are presented to the user, one or more second characters are received from the user, wherein the second character is different from the character (i.e., the character entered during the previous telephone call). For example, the user dials the telephone number 571-555-1234, and enters the sequence 567 (i.e., the character). During a subsequent telephone call the user dials the telephone number 571-555-1234, and enters the sequence 890 (i.e., the second character).

The second character is automatically associated with the telephone number and saved on the memory device. During a telephone call after the subsequent telephone call (e.g., during the third instance that the telephone number was dialed on the telecommunications device, the character and second character are presented to the user. Thus, in at least one embodiment, every character entered into the telecommunications device during a telephone call where a particular telephone number is dialed is saved, and presented to the user during a subsequent telephone call where the particular telephone number is dialed.

In at least one embodiment of the invention, contextual information associated with the character is saved on the memory device. The contextual information can indicate the time of day that the character is entered, the date that the character is entered, and/or the type of call where the character is entered. The type of call can include a business call, a networking call, a customer care call, a teleconference, a voicemail call, a personal call, a private call, a family call, a friends call, a shopping call, and/or a medical call.

When presenting the character to the user, the contextual information can be presented to the user along with the associated character. In at least one embodiment, the character is presented to the user in a list of previously entered characters (e.g., a list of previously entered teleconference passcodes), wherein the previously entered characters in the list are ranked based on the contextual information (e.g., time of day entered). In at least one embodiment, the ranking of the previously entered characters in the list includes determining contextual information for the present telephone call (e.g., time of day) and comparing the contextual information for the present telephone call with contextual information for the previously entered characters in the list (e.g., time of day entered).

In another embodiment of the invention, the character is presented to the user in a list of previously entered characters (menu selections), wherein the list of previously entered characters is ranked based on frequency of use. Thus, the characters that are used more frequently are presented to the user first. In another embodiment, the character is presented to the user in a list of previously entered characters (directory selections), wherein the list of previously entered characters is ranked based on time of last use. Thus, the characters that have been used more recently are presented to the user first. In yet another embodiment, the characters are ranked based on user preferences.

In still yet another embodiment of the invention, as the user begins to enter a sequence of characters in response to the key press options, the telecommunications device automatically fills characters onto the display based on previously entered sequences stored on the memory device. For example, if the sequence "1543893" is stored on the memory device, and the user enters the characters "154", then the sequence "1543893" is presented on the display of the telecommunications device.

In another embodiment of the invention, where a list of previously entered sequences is displayed to the user, and as the user begins to enter characters in response to the key press options, the telecommunications device automatically removes sequences from the list of previously entered sequences that do not match the characters entered by the user. For example, if the user enters the characters "473", sequences are removed from the list that do not include the characters "473".

Figure 3:
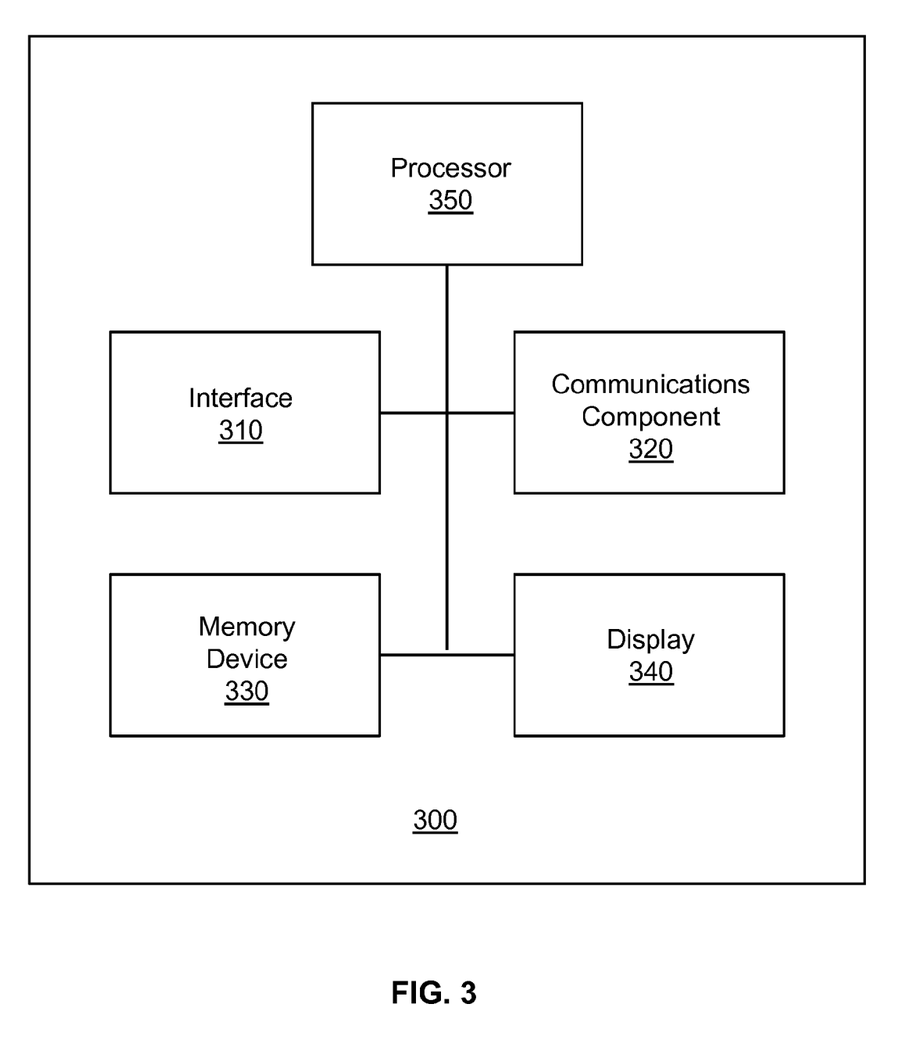
FIG. 3 illustrates a system for communicating on a telecommunications device according to an embodiment of the invention.

FIG. 3 illustrates a system 300 for communicating (e.g., on a telecommunications device) according to an embodiment of the invention. The system includes an interface 310 (e.g., keypad, keyboard, mouse, touchscreen display, microphone, headset, handset) on the telecommunications device. The interface receives a telephone number (can be entire number entered by user or auto-completed) and at least one character (number, letter, or punctuation symbol) from the user, wherein the character is received in response to key press options presented to the user. In at least one embodiment, the key press options are a prompt for a conference call password, voicemail password, language selection, directory options, and/or menu options.

The system 300 further includes an options component 320 (also referred to herein as a means for presenting) connected to the interface 310, wherein the options component 320 presents the key press options to the user. As used herein, the term "connected" includes operationally connected, logically connected, in communication with, physically connected, engaged, coupled, contacts, linked, affixed, and attached. In at least one embodiment, the options component 320 includes an earphone, headset, speaker, and/or visual display (e.g., LED screen, computer monitor).

A memory device 330 (also referred to herein as a means for storing) is also connected to the interface 310, wherein the memory device stores the telephone number and the character received from the user. The memory device 330 is in or connected to the telecommunications device. In at least one embodiment, the memory device includes a flash memory device (NOR or NAND) or a memory card. In at least one embodiment, the system 300 includes a database controller (e.g., in a processor 350) that associates the character with the dialed telephone number in the memory device 330.

A display 340 (also referred to herein as a means for presenting) is connected to the memory device 330, wherein the display 340 presents the character to the user during a subsequent telephone call. In at least one embodiment, the display 340 includes a LED screen and touchscreen or the display 340 is part of a laptop computer and/or computer monitor.

In at least one embodiment of the invention, the system 300 further includes a processor 350 connected to the interface 310, options component 320, memory device 330, and/or display 340. In at least one embodiment, the processor 350 determines contextual information for the present telephone call, wherein the contextual information indicates the time of day that the character is entered, the date that the character is entered, and the type of call where the character is entered. The type of call can include a business call, a networking call, a customer care call, a teleconference, a voicemail call, a personal call, a private call, a family call, a friends call, a shopping call, and/or a medical call. The memory device 330 stores contextual information associated with the character; and, the display 340 presents the contextual information to the user with the character.

In at least one embodiment, the processor 350 compares the contextual information for the present telephone call with contextual information for the previously entered characters in the list. Thus, the character can be displayed in a list of previously entered characters, wherein the previously entered characters in the list are ranked by the processor 350 based on the contextual information. For instance, the processor 350 can rank the characters in the list based on frequency of use and/or time of last use.

In at least one embodiment of the invention, the interface 310 receives at least one second character from the user during a subsequent telephone call where the telephone number is dialed, wherein the second character is different from the character received in the earlier telephone call. The second character is received in response to the key press options presented to the user during the subsequent telephone call. The memory device 330 stores the second character, wherein the second character is with the telephone number (e.g., by the database controller). During a telephone call after the subsequent telephone call (e.g., a third or later telephone call where the telephone number is dialed), the display 340 presents the character and the second character to the user.

In another embodiment of the invention, as the interface 310 receives a sequence of characters (e.g., in response to the key press options), the processor 350 auto-fills characters on the display 340 with characters from the sequence of characters. In yet another embodiment, the display 340 presents a list of previously entered sequences, wherein sequences are removed from the list of previously as the user enters a response to the key press options.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
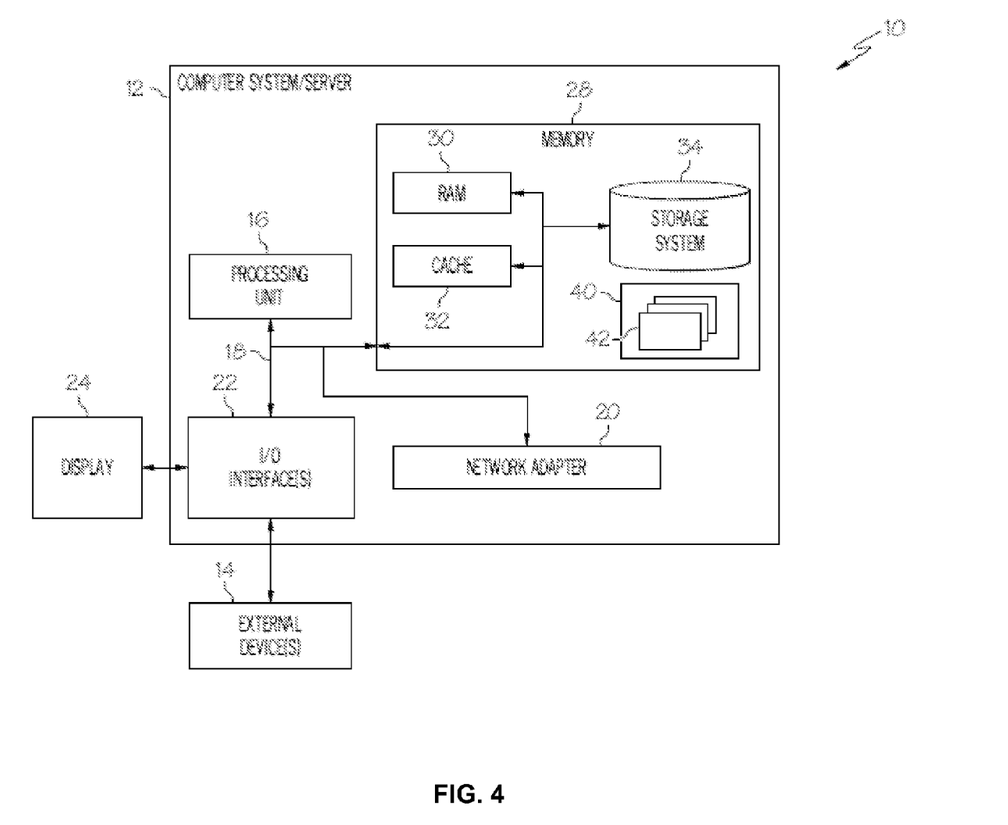
FIG. 4 depicts a cloud computing node according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer systemexecutable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
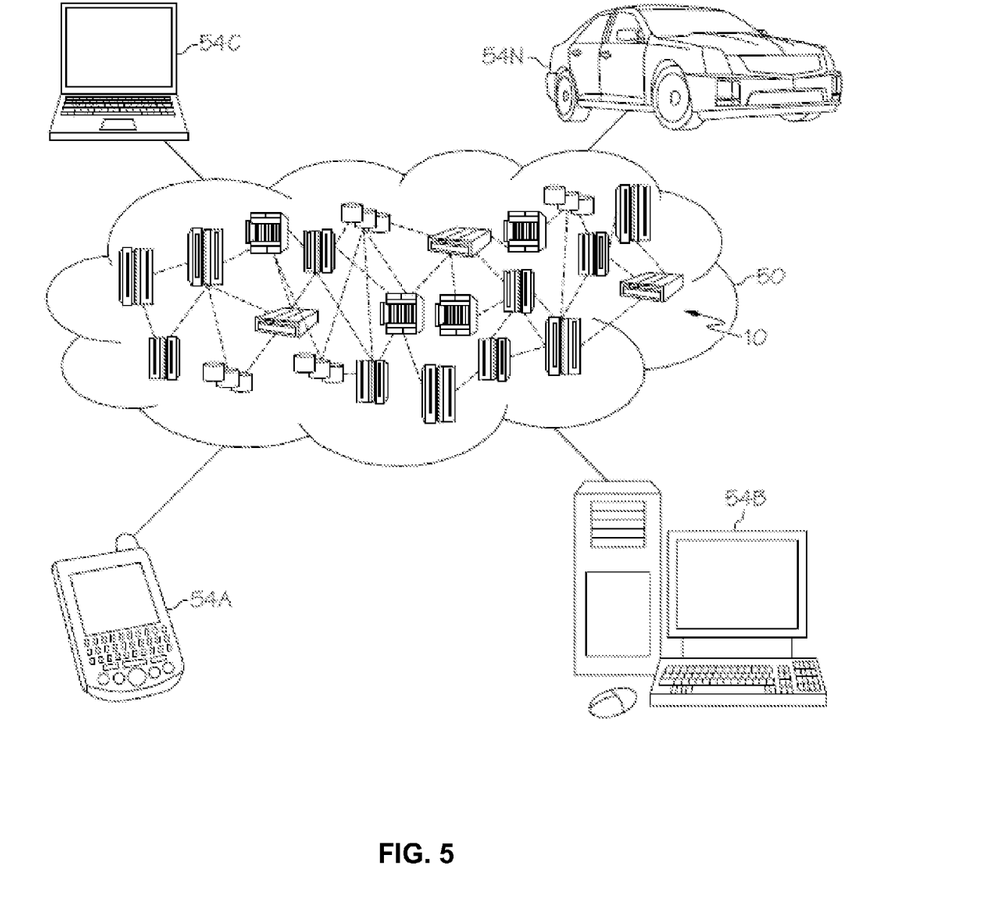
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
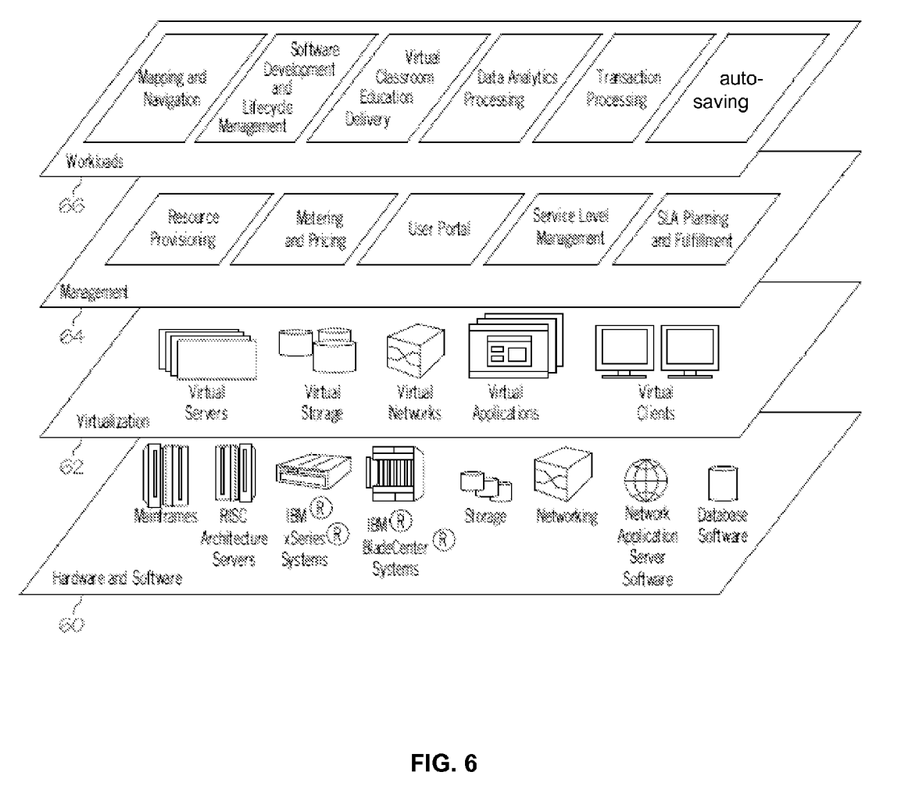
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and auto-saving, retrieving, and presenting key press sequences.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
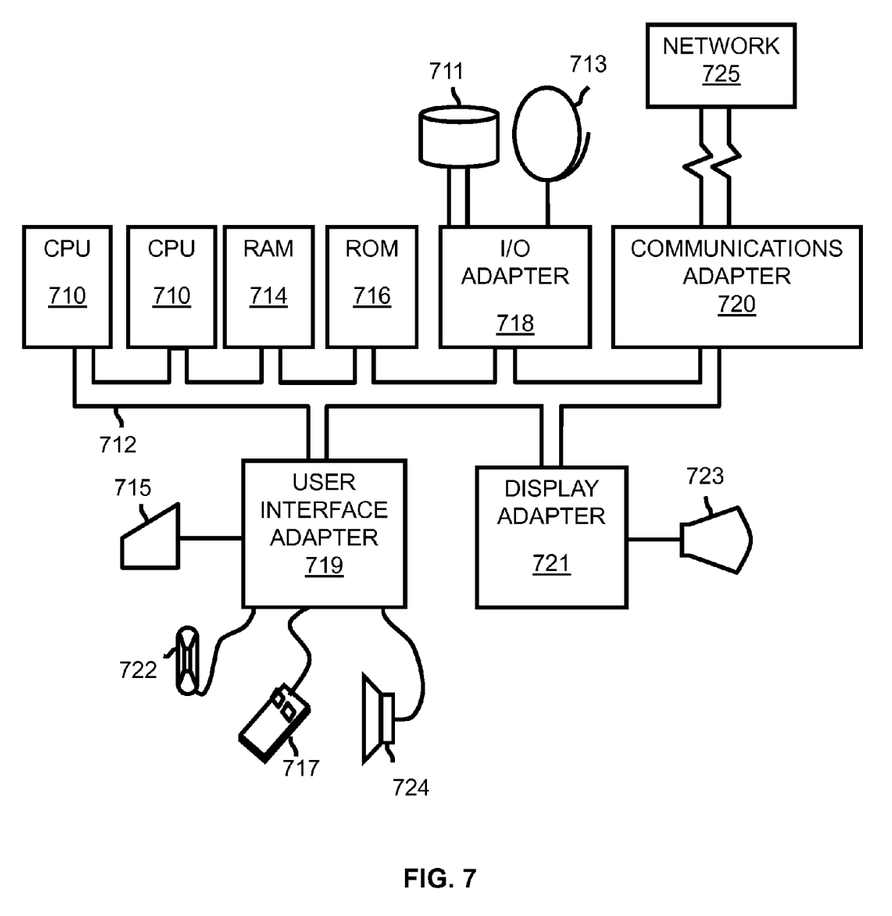
FIG. 7 illustrates a computer program product according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 710. The CPUs 710 are interconnected with system bus 712 to various devices such as a random access memory (RAM) 714, read-only memory (ROM) 716, and an input/output (I/O) adapter 718. The I/O adapter 718 can connect to peripheral devices, such as disk units 711 and tape drives 713, or other program storage devices that are readable by the system. The system can read the inventive instructions on the program storage devices and follow these instructions to execute the methodology of at least one embodiment of the invention. The system further includes a user interface adapter 719 that connects a keyboard 715, mouse 717, speaker 724, microphone 722, and/or other user interface devices such as a touch screen device (not shown) to the bus 712 to gather user input. Additionally, a communication adapter 720 connects the bus 712 to a data processing network 725, and a display adapter 721 connects the bus 712 to a display device 723 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a telephone number from a user via an interface of a telecommunications device;
   receiving at least one character from the user via the interface of the telecommunications device, the at least one character being received in response to key press options presented to the user;
   automatically saving the telephone number and the at least one character received from the user on a memory device;

presenting the at least one character to the user on a display of the telecommunications device during a subsequent telephone call to the saved telephone number, said presenting the at least one character to the user comprising presenting the at least one character in a list of previously entered characters, said presenting the at least one character in a list of previously entered characters comprising ranking the list of previously entered characters based on at least one of frequency of use and time of last use;

receiving at least one second character from the user via the interface during a subsequent telephone call, the at least one second character being different from the at least one character, wherein the at least one second character is received in response to the key press options;

automatically saving the at least one second character on the memory device, said automatically saving of the at least one second character including automatically associating the at least one second character with the saved telephone number; and presenting the at least one character and the at least one second character to the user via the display of the telecommunications device during a telephone call to the saved telephone number after the subsequent telephone call.

2. The method according to claim 1, wherein said automatically saving the telephone number and the at least one character includes automatically associating the at least one character with the telephone number.

3. The method according to claim 1, further comprising saving contextual information associated with the at least one character on the memory device, the contextual information indicating at least one of a time of day that the at least one character is entered, a date that the at least one character is entered, and a type of call where the at least one character is entered.

4. The method according to claim 3, further comprising presenting the contextual information to the user with the at least one character via the display of the telecommunications device.

5. The method according to claim 3, wherein said presenting the at least one character to the user comprises:
presenting the at least one character in a list of previously entered characters via the display of the telecommunications device; and
ranking the previously entered characters in the list with a processor based on the contextual information.

6. The method according to of 5, wherein said ranking the previously entered characters in the list comprises:
determining contextual information for the present telephone call with the processor; and
comparing the contextual information for the present telephone call with contextual information for the previously entered characters in the list with the processor.

7. The method according to claim 3, wherein the type of call includes at least one of a business call, a networking call, a customer care call, a teleconference, a voicemail call, a personal call, a private call, a family call, a friends call, a shopping call, and a medical call.

8. The method according to claim 1, wherein said receiving at least one character includes receiving a sequence of characters with the interface, and wherein said method further comprises auto-filling characters with characters from the sequence of characters as the user enters a response to the key press options with a processor.

9. The method according to claim 1, wherein said presenting the at least one character to the user comprises presenting the at least one character in a list of previously entered characters, and wherein said method further comprises removing characters from the list of previously entered characters as the user enters a response to the key press options.

10. A method for communicating on a telecommunications device, said method comprising:
executing a first telephone call, said executing of the first telephone call including:
receiving a telephone number from a user,
receiving at least one first character from the user, the at least one first character being received in response to key press options presented to the user, and
automatically saving the telephone number and the at least one first character received from the user on a memory device, said automatically saving the telephone number and the at least one first character includes automatically associating the at least one first character with the telephone number;
executing a subsequent telephone call, said executing of the subsequent telephone call including:
receiving the telephone number from the user,
receiving at least one second character from the user, the at least one second character being different from the at least one first character, and
automatically saving the at least one second character received from the user on the memory device, said automatically saving the telephone number and the at least one second character includes automatically associating the at least one second character with the telephone number; and
executing a telephone call after the subsequent telephone call, said executing of the telephone call after the subsequent telephone call including:
receiving the telephone number from the user, and
presenting the at least one first character and the at least one second character to the user with a display of the telecommunications device, said presenting the at least one character to the user comprising presenting the at least one character in a list of previously entered characters, said presenting the at least one character in a list of previously entered characters comprising ranking the list of previously entered characters based on one of frequency of use and time of last use.

11. The method according to claim 10, further comprising:
saving first contextual information associated with the at least one character, the contextual information indicating a time of day that the at least one character is entered, a date that the at least one character is entered, and a type of call where the at least one character is entered; and
saving second contextual information associated with the at least one second character, the contextual information indicating at least one of a time of day that the at least one second character is entered, a date that the at least one second character is entered, and a type of call where the at least one second character is entered.

12. The method according to claim 11, further comprising at least one of:
presenting the contextual information to the user with the at least one character; and
presenting the contextual information to the user with the at least one second character.

13. The method according to claim 11, wherein said presenting the user with the at least one first character and the at least one second character comprises:
presenting a list of previously entered characters; and ranking the previously entered characters in the list based on the first contextual information and the second contextual information.

14. The method according to claim 13, wherein said ranking the previously entered characters in the list comprises:
- determining contextual information for the present telephone call; and
- comparing the contextual information for the present telephone call with contextual information for the previously entered characters in the list.

15. A method for communicating on a telecommunications device, said method comprising:
- receiving a telephone number from a user via an interface of a telecommunications device;
- receiving at least one character from the user via the interface of the telecommunications device, the at least one character being received in response to key press options presented to the user;
- automatically saving the telephone number and the at least one character received from the user on a memory device, said automatically saving the telephone number and the at least one character includes automatically associating the at least one character with the telephone number;
- saving contextual information associated with the at least one character, the contextual information indicating at least one of a time of day that the at least one character is entered, a date that the at least one character is entered, and a type of call where the at least one character is entered;
- presenting the at least one character in a list of previously entered characters to the user on a display of the telecommunications device during a subsequent telephone call, said presenting the at least one character comprising ranking the list of previously entered characters based on one of frequency of use and time of last use;
- receiving at least one second character from the user during a subsequent telephone call, the at least one second character being different from the at least one character, wherein the at least one second character is received in response to the key press options;
- automatically saving the at least one second character, said automatically saving of the at least one second character including automatically associating the at least one second character with the telephone number; and
- presenting the at least one character and the at least one second character to the user during a telephone call after the subsequent telephone call.

16. The method according to claim 15, further comprising presenting the contextual information to the user with the at least one character.

17. The method according to claim 15, wherein said presenting the at least one character comprises ranking the previously entered characters in the list based on the contextual information.

* * * * *